UNITED STATES PATENT OFFICE.

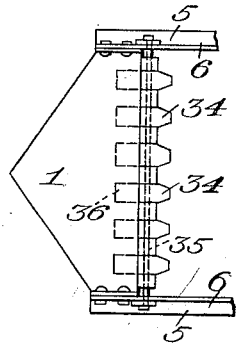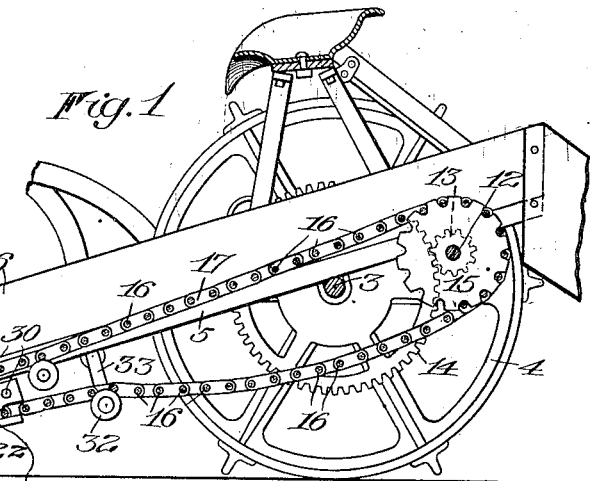

WILLIAM H. RICE, OF ROCHESTER, NEW YORK.

AGRICULTURAL IMPLEMENT.

934,934.

Specification of Letters Patent. Patented Sept. 21, 1909.

Original application filed December 26, 1905, Serial No. 293,167. Divided and this application filed January 8, 1909. Serial No. 471,328.

*To all whom it may concern:*

Be it known that I, WILLIAM H. RICE, of Rochester, in the county of Monroe and State of New York, have invented certain new and useful Improvements in Agricultural Implements; and I do hereby declare the following to be a full, clear, and exact description of the same, reference being had to the accompanying drawings, forming a part of this specification, and to the reference-numerals marked thereon.

The present invention relates to agricultural implements, and more particularly to the type known as diggers which excavate the earth and carry it with the potatoes, or similar growing articles, to a separator to remove the earth, an object of the invention being to protect against the action of stones, dirt or other matter, the pulleys that guide the endless conveyer in proximity to the excavator.

Another object of the invention is to provide a simple and inexpensive construction which will be strong enough to withstand the rough uses to which it is to be subjected, and a further object is to provide an improved means for mounting the conveyer on the frame in order to facilitate the adjustment and the repair thereof.

To these and other ends the invention consists in certain improvements and combinations of parts all as will be hereinafter more fully described, the novel features being pointed out in the claims at the end of the specification.

In the drawings: Figure 1 is a view in longitudinal section of that portion of a potato digger to which my improvements are directed; Fig. 2 is a detail view illustrating one of the guards or shields for the forward pulleys about which the conveyer passes; Figs. 3 and 4 are sections on the lines *a—a* and *b—b* respectively of Fig. 2; Fig. 5 is a detail sectional view showing the guard removed; and Fig. 6 is a detail plan view of the excavator and the forward portion of the conveyer illustrating the manner of bridging the space between these parts and the conveyer.

The subject matter of this application has been divided from my application No. 293,167 filed December 26, 1905.

In the present embodiment of the invention there is employed a frame which preferably comprises an excavator 1 adapted to penetrate the earth, and side pieces extending rearwardly therefrom and supported near their rear ends on the axle 3 carrying the ground wheels 4. The side pieces may be in the form of angle bars 5 each having its lower horizontal flange secured to the axle 3 and a vertical side plate 6 secured to and extending upwardly from its horizontal flange.

Preferably arranged between the sides of the main frame and supported at its forward end in proximity to the excavator and at its rear end near the rear end of the main frame, is a conveyer in the form of an endless chain embodying rods 16 extending transversely between the sides of the frame and connected at their ends by links 17, each of the rods in this instance being reduced at 18 and having the ends of the links 17 turning thereon and secured thereto by upsetting the ends of the rods at 19.

The forward end of the conveyer is preferably supported in proximity to the excavator by guiding pulleys or wheels 10 located at opposite sides of the conveyer and each having an integral stud 9 turning in a bearing 8 that is formed in a bracket 7 preferably detachably secured to the under side of an angle bar 5 by bolts 11. The outer end of each roller may be provided with an annular flange or rim which engages the rods of the conveyer as they travel around. The rear end of the conveyer may be supported by sprocket wheels 15 arranged on a transversely extending shaft 12 that is driven by a pinion 13 thereon meshing with a large gear 14 on the wheel 4.

The edges of the lower part of the conveyers may be supported above the earth to protect the conveyer against stones or the like and at the same time to prevent its digging into the earth. The supports in this instance are in the form of runners 20, each bolted to one of the angle bars 5 at 21 and extending laterally at 22 beneath the proximate pulley and the conveyer to form a shoe, the forward end of which is turned or deflected upwardly at 23 and has its inner edge beveled or inclined at 24 to deflect stones and other obstacles inwardly and beyond the inner side of the proximate pulley. The lower lap of the conveyer may be held in alinement with shoes by pulleys 32 suspended by arms 33 from the side pieces of the frame.

To protect the pulleys against the stones or other material dropping through the upper lap of the conveyer and held on the lower lap, there may be employed shields or guard strips preferably attached to the sides of the frame and converging at 26 toward each other between the laps of the conveyer and about the rear portions of said guiding wheels or pulleys, a finger 27 being extended forwardly over the inner end of the pulley. A top 25 on each shield may project outwardly into proximity to the rear face of its pulley and close the space in rear of the latter between the converging face 26 and the frame side. Preferably each guard is loosely mounted so that it may rise and fall with the conveyer and to this end each runner 20 is provided with vertically arranged slots 28 in which work integral bosses 29 on one of the guards, bolts 30 serving to hold the guards in position. To the end that the guards will ride freely on the conveyer, each is provided with a depending lip or rib 31 on its inner edge beyond the links 17.

The space between the forward end of the conveyer and the rear end of the excavator, or shovel, is closed by a plurality of gates 34 pivoted side by side for independent movement on the transversely extending shaft 35 and held in a normal position by fingers 36 engaging the lower side of the shovel. The rear ends of the gates are pointed or tapered and lie in proximity to the conveyer so as to provide an apron which will conduct all the material received by the shovel onto the conveyer. The points of the gates being separated they are only required to move or yield slightly upward to allow articles lodged on the conveyer to pass upwardly beneath them.

In operation, the machine is drawn forwardly by any suitable draft means causing the earth to be excavated and carried upwardly onto the conveyer, the space between the excavator and the conveyer being bridged by the gates which yield upwardly when stones or other material are caught in the conveyer and carried completely around to the gates. The shoes 22 deflect the stones on the under side of the lower lap of the conveyer away from the pulleys and also deflect material in advance of the conveyer away from the pulleys, while the guard faces 26 of the shield act to deflect stones away from the pulleys on the upper side of the lower lap, and the tops 25 prevent stones wedging behind the shields 26.

A digger embodying these improvements is inexpensive to manufacture and simple in operation, and it is not liable to be placed out of commission because of breakage due to stones becoming wedged between the conveyer and the supporting and guiding pulleys. Further the forward end of the conveyer is protected against stones, stumps or other obstructions which would tend to disarrange or break the conveyer.

I claim as my invention:

1. In a potato digger, an elevator frame, a conveyer mounted for movement thereon, conveyer guiding wheels journaled in the sides of the frame, and guard strips attached to the sides of the frame and converging toward each other about the rear portions of the said guiding wheels.

2. In a digger, the combination with an excavator, an endless conveyer, and pulleys arranged on opposite sides of the conveyer for supporting the latter, of shields located between the laps of the conveyer and having faces converging toward each other about the pulleys.

3. In a digger, the combination with an excavator, an endless conveyer, and pulleys arranged on opposite sides of the conveyer for supporting the latter in proximity to the excavator, of shields arranged between the laps of the conveyers, having forwardly converging faces and covering the rear faces of the pulleys.

4. In a digger, the combination with a frame having an excavator at its forward end and side pieces extending rearwardly therefrom, an endless conveyer arranged between the side pieces and pulleys carried by the side pieces near the forward end of the conveyer for supporting opposite sides of the latter, of forwardly converging shields extending over the inner ends of the pulleys and about their rear faces.

5. In a digger, the combination with an excavator, of an endless conveyer embodying transversely extending rods, pulleys arranged on opposite sides of the conveyer for guiding the latter in proximity to the excavator, and shields for the pulleys arranged between the laps of the conveyer covering the rear faces of the pulleys and having faces arranged to shift material along the rods and away from the pulleys.

6. In a digger, the combination with a frame having an excavator and side pieces extending rearwardly from the excavator, of pulleys carried by the side pieces in proximity to the excavator, an endless conveyer guided about the pulleys, and shields for the pulleys having converging walls extending about the rear faces of the latter and top walls extending outwardly from the converging walls to close the space between the converging walls and the pulleys.

7. In a digger, the combination with an excavator, of an endless conveyer arranged in rear of the excavator, guiding pulleys arranged on opposite sides of the conveyer in proximity to the excavator, and shields for the rear faces of the pulleys, having walls for deflecting material laterally from said pulleys and top walls inclosing the space directly in rear of the pulleys.

8. In a digger, the combination with an excavator, a conveyer, and pulleys guiding the latter on opposite sides in proximity to the excavator, of shields for the rear faces of the pulleys, each having a top arranged in proximity to the pulleys and a forwardly projecting end extending over the end of the proximate pulley.

9. In a digger, the combination with an excavator, an endless conveyer receiving material from the excavator, and pulleys for supporting the conveyer in proximity to the excavator, of loosely supported shields for the rear faces of the pulleys.

10. In a digger, the combination with an excavator, an endless conveyer receiving material from the excavator, and pulleys for guiding the conveyer, of loosely supported shields for the pulleys arranged between the laps of the conveyer and coöperating with the lower lap.

11. In a digger, the combination with a frame having an excavator thereon and side pieces extending rearwardly from the excavator, of an endless conveyer operating between the side pieces, pulleys for guiding the conveyer in proximity to the excavator, and shields supported loosely between the laps of the conveyer, and having faces deflecting material laterally away from the pulleys.

WILLIAM H. RICE.

Witnesses:
HAROLD H. SIMMS,
HENRY W. HALL.